Sept. 17, 1940.  G. C. PEARSON  2,215,376
THROTTLE VALVE FOR PNEUMATIC TOOLS
Filed May 17, 1939  3 Sheets-Sheet 1
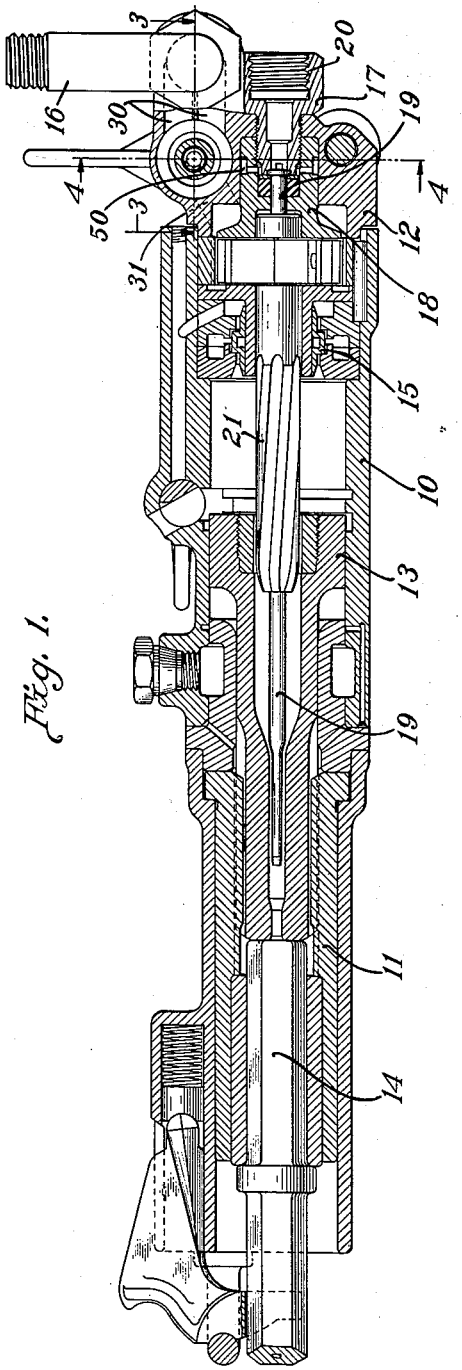
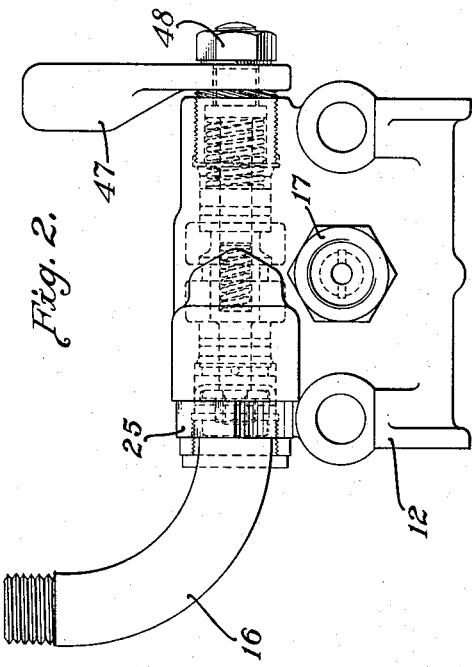
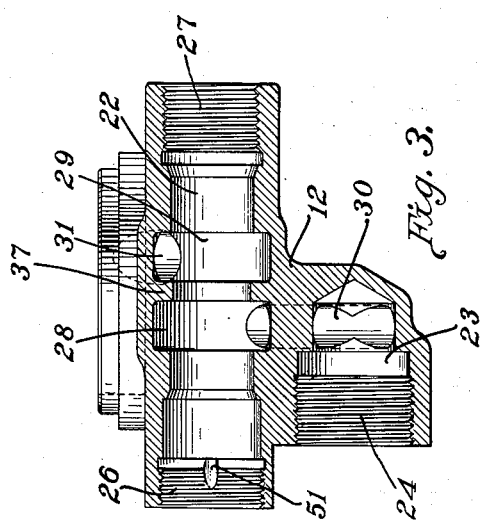
INVENTOR.
Gustav C. Pearson
BY J. S. Carpenter
ATTORNEY.

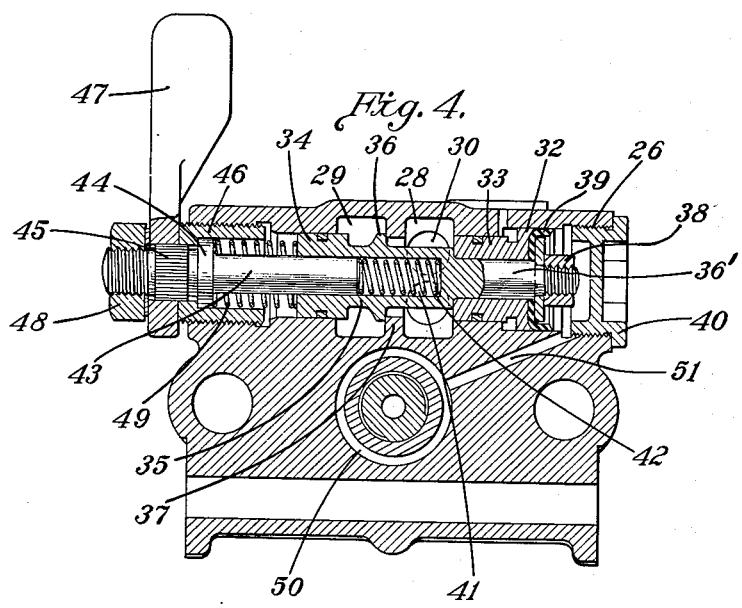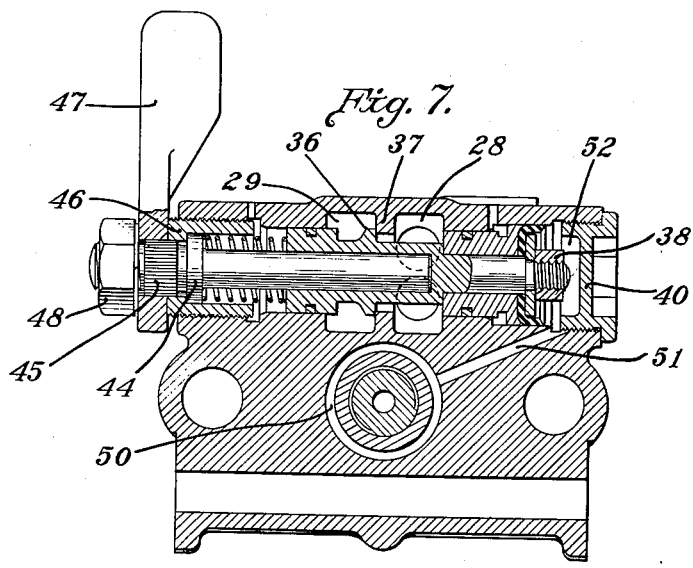

Sept. 17, 1940.   G. C. PEARSON   2,215,376
THROTTLE VALVE FOR PNEUMATIC TOOLS
Filed May 17, 1939   3 Sheets-Sheet 3

INVENTOR.
Gustav C. Pearson
BY
ATTORNEY.

Patented Sept. 17, 1940

2,215,376

UNITED STATES PATENT OFFICE 2,215,376

THROTTLE VALVE FOR PNEUMATIC TOOLS

Gustav C. Pearson, Denver, Colo., assignor to Gardner-Denver Company, Quincy, Ill., a corporation of Delaware Application May 17, 1939, Serial No. 274,237

13 Claims. (Cl. 121—11)

This invention relates to improvements in rock drills and is more particularly directed to a throttle valve controlling the flow of operating fluid to the distributing valve of a drill.

The principal object of the invention is the provision of a valve adapted to control the flow of operating fluid from a source to the distributing valve of a drill, and the operation of said valve being both manual and automatic, the latter by cleansing fluid serving to remove the cuttings from the drilled hole.

Another object of the invention is the provision of a pressure fluid controlling valve capable of being moved to an open position upon the entrance of cleansing fluid under pressure to the drill and automatically closing upon the interruption or stoppage of the cleansing fluid pressure.

Still another object of the invention resides in the provision of a valve controlling the flow of operating fluid to the cylinder of a rock drill, said valve being moved to an open position by the pressure of the cleansing fluid as it passes to the drill and capable of being moved manually to a closed position during the continued admission of the cleansing fluid.

A further object of the invention resides in the provision of a valve adapted to control the flow of operating fluid to the distributing valve of a rock drill. The valve being definitely moved manually to a closed position at the moment stoppage of the drill is desired; and then manually adjusted to a position whereby admission of cleansing fluid under pressure to the drill will automatically open the valve, permitting the passage of operating fluid from a source to a distributing valve, and further if during the period of operation the admission of cleansing fluid is for any reason stopped or interrupted, the valve will automatically close. Whereupon the operator either locks the valve against opening upon the resumption of the flow of cleansing fluid as previously mentioned or permits the valve to remain in the position indicated so that when the pressure of cleansing fluid again resumes, the valve will open permitting the flow of operating fluid to the distributing valve.

Further objects of the invention will hereinafter appear, and to all of these ends the invention consists of the features of construction, arrangement of parts, and combination of elements, substantially as hereinafter fully described and claimed in the specification and shown in the accompanying drawings, in which:

Figure 1 is a sectional view taken longitudinally through a hand held drill showing the same equipped with a fluid control valve adapted to automatically open by pressure of the cleansing fluid.

Figure 2 is a rear view of the backhead forming a part of the drill and in which the control valve is mounted, as indicated by dotted lines.

Figure 3 is a horizontal sectional view taken on the line 3—3 of Figure 1, showing in section that portion of the backhead which serves to house the automatic valve.

Figure 4 is a sectional view taken on the line 4—4 of Figure 1, showing the control valve closed and locked in such a position.

Figure 7 is a modified form of the control valve showing definitely a rigid connection between the valve and operating handle.

Figure 5:
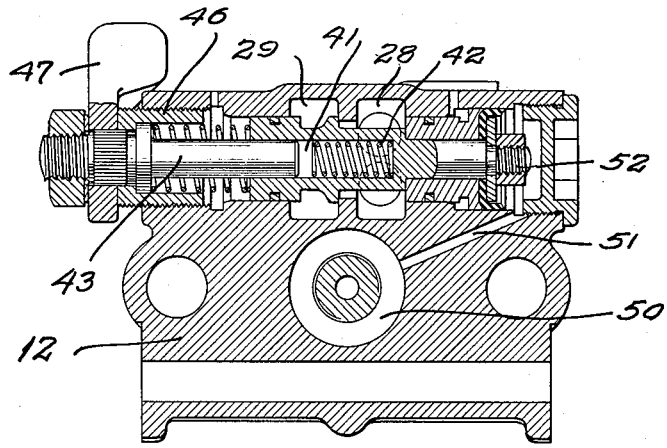
Figure 5 is a view similar to Figure 4 but shows certain parts of the valve moved manually to such a position that the valve will automatically open upon the admission of cleansing fluid to the drill.

Briefly my invention relates to an improved valve adapted to control the flow of operating fluid from a source to the distributing valve of a rock drill. The valve being so constructed as to permit its being manually locked in a closed position and upon the initial starting of the drill certain parts of the valve are manually adjusted with respect to the valve element proper so that the latter will automatically move to an open position upon the introduction of cleansing fluid under pressure to the drill. The structure hereinafter described permits the valve to remain open only during the period that pressure influences the flow of cleansing fluid through the drill and should an occasion arise when the pressure of cleansing fluid is stopped or for any reason interrupted, the valve will automatically close, preventing the operation of the drill.

The valve may be manually adjusted upon the completion of the drilling period to prevent the pressure of cleansing fluid from opening the valve. During certain operations, occasions arise when it becomes necessary to stop for a moment the operation of the drill but continue the admission of the cleansing fluid. The structure described can be operated manually on such occasions.

The provision of a common valve controlling operating and cleansing fluids to a drill or a separate valve for each is common. Such has been the practice for years. However, recent requirements in certain localities, necessitate the positive admission of cleansing fluid during the operation of the drill and it has been found desirable to provide a valve, such as that set forth, whereby the initial entrance of cleansing fluid through the drill controls the opening of the valve for the flow of operating fluid leading from a source to the distributing valve of a drill. Therefore, one of the purposes of the present invention is to provide a valve which automatically opens upon the admission of the cleansing fluid, remains open as long as the pressure is active upon the cleansing fluid and yet capable of being closed manually during the continued entrance of the cleansing fluid, and locked manually against opening of the valve when the period of work has been accomplished.

Referring to the accompanying drawings in detail, the numeral 10 indicates the cylinder of the rock drill having at its front end a suitable housing within which is a chuck 11 and at its rear end, a backhead 12 all of which are maintained in alignment by suitable tie rods. The cylinder 10 of the drill has positioned therein for reciprocation a piston hammer 13, intended to strike the shank portion of a drill steel 14 positioned within the chuck 11.

As is common in drills of this type, a distributing valve 15 is provided controlling the reciprocation of the piston hammer 13 by directing operating fluid from a source to opposite faces of the piston head. Fluid distributed by the valve 15 is supplied to the drill from a suitable source through a flexible hose (not shown) connected to a swivelled goose-neck 16 mounted in the backhead 12.

The backhead 12 as disclosed in Figures 1 and 3 is provided with a reduced flange receivable within the rear end of the cylinder 10 and central of the backhead 12 is positioned a nipple 17 having a reduced portion externally threaded for the reception of a plug 18 positioned within the inner face of the backhead. The plug 18 has affixed thereto in any desired manner a water tube 19. The large end of the nipple 17 is provided with a threaded socket 20 for the reception of a water supply hose (not shown). The water tube 19 carried by the backhead 12 extends through the rifle bar 21, centrally of the cylinder 10, hammer 13 and terminates adjacent the shank portion of the steel. It is obvious that water or cleansing fluid under pressure as it enters through the tube 19, ultimately passes downwardly through the bore of the steel 14 to the bottom of the hole being drilled, removing the cuttings therefrom and reducing to a minimum the dust particles occurring as the steel penetrates the rock.

As shown in Figure 3, the backhead 12 is provided with a horizontal bore 22 and a socket 23, both of which lie within the same horizontal plane. The socket 23 is threaded as indicated at 24 for the reception of a nut 25 holding within the socket the flared end of the swivelled gooseneck 16 to which the air hose is connected.

As further shown in Figure 3 the horizontal bore 22 is formed of several diameters and its end portions are interiorly threaded as indicated at 26 and 27, the latter having threads of a greater pitch than the former for the purpose hereinafter set forth. Midway between the threaded ends of the bore 22 are annular grooves 28 and 29, the former being in communication, through passageways 30, with a reduced portion of the socket 23, while the second annular groove 29 has leading therefrom a passageway 31 opening into the interior of the drill cylinder, particularly that portion in rear of the valve 15 where air as it flows from the socket 23 might be distributed to the faces of the operating hammer.

Positioned for longitudinal movement within the bore 22 and adjacent its threaded end 26 is a plunger 32 having a reduced portion 33 fitting within a correspondingly reduced portion of the bore. Also positioned within the bore and in line with the plunger 33 is a second plunger 34 having a reduced extension 35 upon which is formed internal, a radial extending flange 36 engageable with one face of a wall 37 lying between the annular grooves 28 and 29. This extension 35 is further reduced as indicated at 36' to receive thereover the plungers 32—33 previously referred to. The end portion of the extension 36' is threaded and engageable by nut 38 retaining the plungers 32—33 securely upon the reduced portion 36'. Positioned between the nut 38 and the end face of the plunger 32 is a packing ring 39, serving to prevent both leakage and the intermingling of the cleansing and operating fluids. The end of the bore 22 is closed by a threaded plug 40 engageable with the threads 26 of the bore.

It will be observed from Figure 4 that the plunger extension 35 is provided with a central bore 41 receiving therein a coil spring 42 and a stem 43. The latter having adjacent its outer end a flange 44 and a serrated portion 45. Fitted over the serrated portion and abutting the flange 44 is a movable sleeve 46, the exterior of which is threaded and engages the threads formed at 27 within the bore 22. Also positioned over the serrated portion is an operating handle 47 retained thereupon by a nut 48. Upon referring to Figure 3, it will be observed that the threads indicated at 27 engageable by a sleeve 46 are of a relatively long pitch. Thus when the operating handle 47 is swung manually, the sleeve 46 is moved inwardly or outwardly of the bore 22, the result being that the stem 43 is quickly moved back and forth within the bore 41 of the extension 35, thus controlling and limiting the movement of the valve carrying plungers 32—33—34 within the bore 22.

Between adjacent faces of the plunger 34 and the flange 44 is a second coil spring 49, serving to maintain the plunger 34 in a closed position, particularly when the valve is not held in an open position by pressure of the cleansing fluid.

As shown in Figures 1 and 4, cleansing fluid as it enters the backhead through the nipple 17 passes therefrom into an annular groove 50 from which leads a passageway 51 communicating with a chamber 52, formed between the outer end of the enlarged plunger 32 and the plug 40. Thus it will be evident that the cleansing fluid confined within this chamber will be active upon the face of the plunger 32.

From the foregoing description, it is obvious that when cleansing fluid is admitted into the bore 17, it passes from the annular groove 50 through the passageway 51 to the chamber 52 where it engages the rear face of the moveable plunger 32, moving the same inwardly of the bore 22, the result being the valve 36 carried by the plunger extension 35, is moved from its engagement with the dividing wall 37 between the annular grooves 28 and 29, thus permitting the passage of operating fluid from the swivel connection 16 through the passageways 30 to the annular groove 28 through the opening provided by the movement of the valve 36 and ultimately to the distributing valve 15 of the drill.

The valve remains in its open position as long as the admission of cleansing fluid under pressure through the backhead continues. Any interruption in the pressure of the cleansing fluid will relieve pressure on the rear face of the plunger 32 and by action of the spring 49, the moveable plunger 34 will again move longitudinally of its bore until the flange 36 engages the dividing wall 37 between the annular grooves 28 and 29 thus cutting off the supply of air from the source to the distributing valve.

Figure 7 discloses a modified form of the invention and it will be observed that the spring 42 has been eliminated and the stem 43 controlled by movement of the handle has been elongated, making practically a rigid construction between the moveable part of the valve and the handle. Thus when the handle is turned as previously referred to, the stem is forced either inwardly or outwardly, controlling the operation of the valve in relation thereto. It will of course be obvious that when the handle 47 occupies a position as shown in Figure 7, opening of the valve by pressure of the cleansing fluid is prevented. However, when the handle is moved as shown in Figure 5, the valve is free to open upon the admission of the cleansing fluid to the drill.

With this structure it will be obvious that the operation of the drill is not possible until cleansing fluid under pressure has been admitted thereto and moreover that operation of the drill continues only as long as the pressure of cleansing fluid is active upon the plunger 26.

Figure 6:
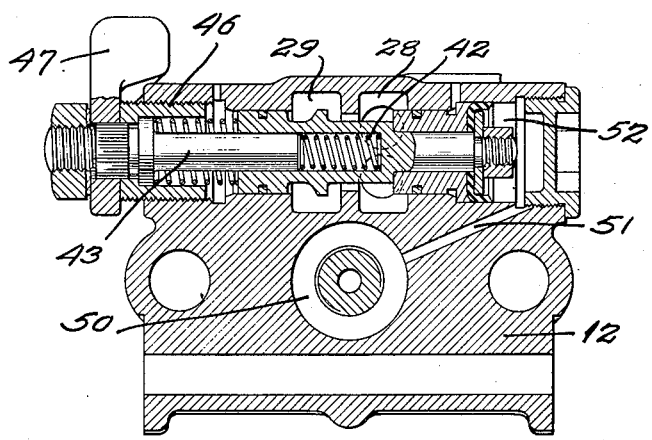
Figure 6 is a view similar to Figure 5 but shows the position occupied by the valve when moved to an open position by the cleansing fluid.

Briefly, the operation of the above described improvement is as follows:

Assuming that the drill is initially being placed in operation, the various parts of the control valve will occupy the position shown in Figure 4 with the handle 47 moved substantially vertical so that the sleeve 46 is moved inwardly of the bore 22, the result being that the stem 43 which is a part of the operating handle, moves inwardly compressing the spring 42 to its maximum tension thus insuring the closing of the valve. The operator then regulates the water pressure entering the nipple 17 and as a result of the construction previously referred to, water pressure enters through the passageway 51 into the chamber 52 bearing upon the end of the plunger 32. Inasmuch as the stem 43 is moved inwardly, movement of the valve to its open position is prevented. The operator then grasps the handle 47, swinging it to substantially the position shown in Figure 5, whereupon the sleeve 46 is rotated with respect to the bore thus moving the sleeve outwardly and at the same time the stem 43. Such action permits the valve formed of the plungers 32, 33, 34 and the flange 36 to be forced longitudinally of the bore 22 by the water pressure, whereupon the valve ultimately opens as shown in Figure 6, thus establishing communication between the goose-neck 16 and the distributing valve 15 setting in operation the drill. This action continues as long as the operation of the drill is desired. However, during that operation an occasion might arise when it is desirous to interrupt for a moment the flow of air passing to the distributing valve. When such occurs, the handle 47 is again grasped by the operator moving the sleeve 46 inwardly of the bore, the result being that the stem 43 is likewise moved inwardly, forcing the flange 36 of the valve into contact with the wall 37, thus cutting off the supply of air. However, during the operation of the drill the parts assume the position as shown in Figure 6. This continues until the work has been accomplished whereupon the drill may be stopped by cutting off the supply of water which reduces the pressure active upon the plunger 32 and when this pressure is lacking the spring 49 moves the valve to the closed position as shown in Figure 5. The parts may be permitted to remain in this position if a resumption of drilling is desired, whereupon the supply of water pressure leading to the backhead is established and when it becomes active on the face of the plunger 32, the valve is moved to an open position.

Thus it will be apparent that with the foregoing explanation the valve may be either manually or automatically controlled solely by the water pressure or it may be controlled by a combination of both.

From the foregoing it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. A throttle valve comprising a casing having therein a bore to which cleansing fluid is admitted, separate chambers within the bore one of which is subject to fluid under pressure, an element moveable within the bore controlling the flow of fluid from one chamber to the other, a member moveable with respect to the bore and engageable with the element, said element being urged to a position by the cleansing fluid establishing communication between the chambers, and movement of the member controlling the movement of the element.

2. In a rock drill, the combination of a chamber having therein a reciprocating hammer and a water tube, a supply for water under pressure to the tube, a valve controlling the flow of fluid to the chamber setting in motion the hammer, said valve having a portion engageable by water pressure, and the admission of water pressure to the tube being active upon the valve governing its opening and closing movements.

3. In a rock drill, the combination of a chamber having therein a reciprocating hammer and a water tube, a supply for water under pressure to the tube, a valve controlling the flow of fluid to the chamber setting in motion the hammer, a member movable by water pressure as it enters the tube, and said member governing the operation of the fluid supply valve.

4. In a rock drill, the combination of a reciprocating hammer for imparting blows to a steel and a tube conducting water under pressure thereto, a valve controlling the flow of operating fluid to the hammer, said valve having a face engageable by water pressure, and the entrance of water pressure into the tube controlling the operation of the first said valve.

5. In a rock drill, the combination of a reciprocating hammer for imparting blows to a steel and a tube conducting water under pressure thereto, a valve controlling the flow of operating fluid to the hammer, said valve being engageable by water pressure, and the entrance of water pressure into the tube moving the fluid control valve to an open position.

6. In a rock drill, the combination of a reciprocating hammer for imparting blows to a steel and a tube conducting water under pressure thereto, a valve controlling the flow of operating fluid to the hammer, said valve being engageable and operable by water pressure as it enters the tube, and manual means controlling the further operation of said valve.

7. In a rock drill, the combination of a reciprocating hammer for imparting blows to a steel and a tube conducting water under pressure thereto, a valve controlling the flow of operating fluid to the hammer, said valve being of two parts, one part movable by water pressure as it enters the tube, the other part controlling the flow of operating fluid to the hammer, and movement of the first said part controlling the movement of the other part.

8. In a rock drill, the combination of a reciprocating hammer for imparting blows to a steel and a tube conducting water under pressure thereto, a valve controlling the flow of operating fluid to the hammer, said valve having two portions, one portion controlling the flow of operating fluid to the hammer, the other being movable by water pressure as it enters the tube, movement of the last said portion controlling the movement of the first said portion, and means engageable with one portion of the valve for limiting its operation when under the influence of water pressure.

9. In a rock drill, the combination of a reciprocating hammer for imparting blows to a steel and a tube conducting water under pressure thereto, a valve controlling the flow of operating fluid to the hammer, an extension on the valve engageable by water pressure, and the admission of water pressure to the tube being active upon the extension governing the operation of the fluid supply valve.

10. In a rock drill, the combination of a piston hammer imparting blows to a steel and a tube conducting water under pressure thereto, a distributing valve controlling motive fluid active upon the hammer, a second valve controlling motive fluid to the distributing valve, said second valve having a portion acted upon by water pressure, means manually controlling the said second valve, and the said second valve being automatically operated upon by the admission of water pressure into the tube.

11. In a rock drill, the combination of a piston hammer imparting blows to a steel and a tube conducting water under pressure thereto, a valve controlling the flow of operating fluid active upon the hammer, said valve being engageable by water pressure as it enters the tube controlling the same in its operation, and manually operated means capable of controlling the valve during its period of operation.

12. In a rock drill, the combination of a piston hammer imparting blows to a steel and a tube conducting water under pressure thereto, a valve controlling fluid active upon the hammer, said second valve being automatically operated by water pressure, and manually operated means for locking said valve against movement by the water pressure.

13. A throttle valve comprising a casing having therein a bore to which water under pressure is admitted, separate chambers within the bore, one of which is subject to fluid under pressure, a valve movable within the bore controlling the flow of fluid under pressure from one chamber to the other, a stem movable longitudinally of the bore and engageable with the valve, said valve having a portion engageable by water pressure and urged to an open position thereby, and the movement of said stem controlling the opening movement of said valve.

GUSTAV C. PEARSON.